Feb. 1, 1955
A. P. KLASING
2,701,013
AUTOMATIC SHEET FEEDING, POSITIONING, PUNCHING, AND CUTTING MACHINE
Filed March 19, 1951
4 Sheets-Sheet 4
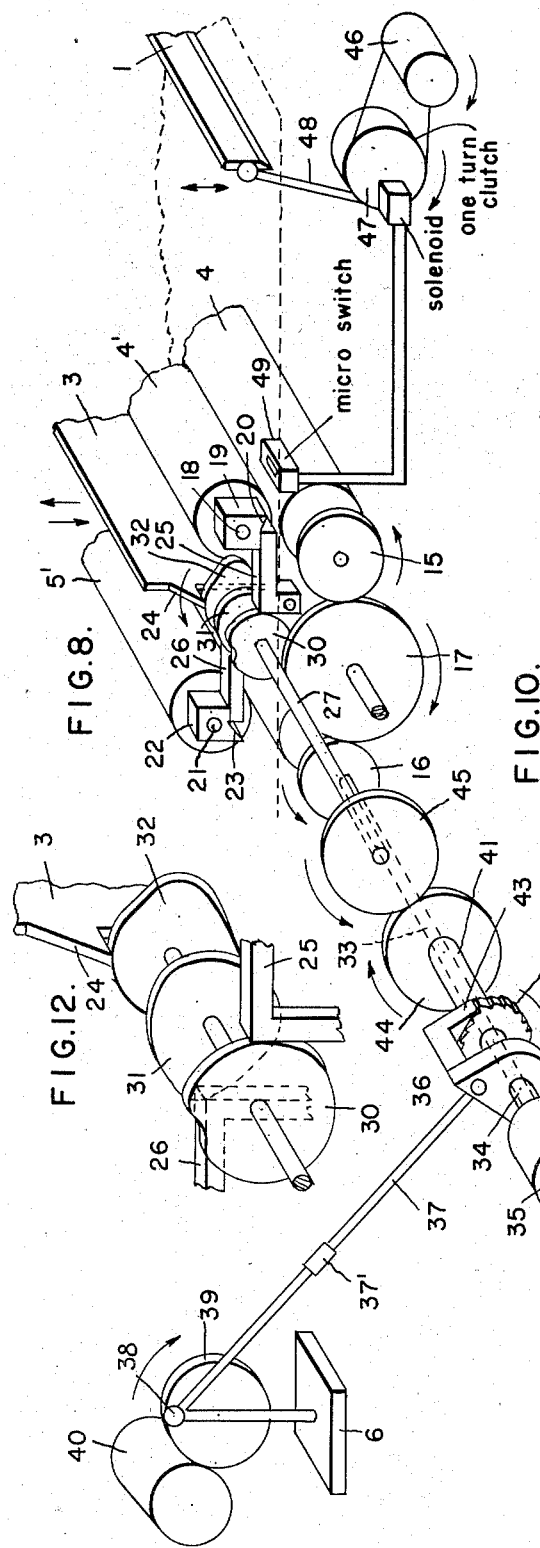
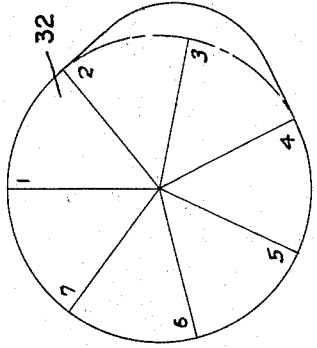
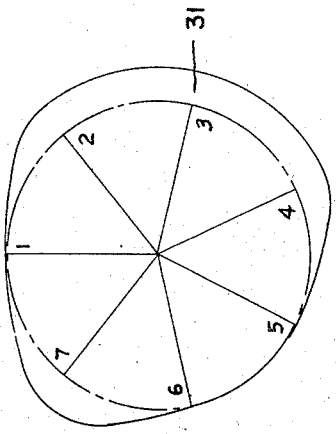
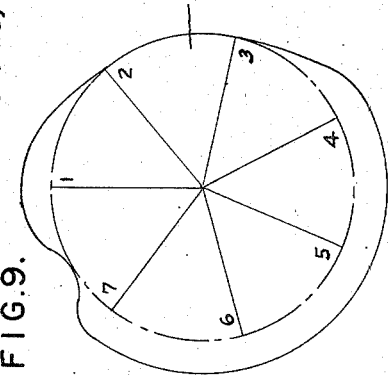
Inventor
Arthur P. Klasing
By Carr & Carr & Gravely
ATTYS.

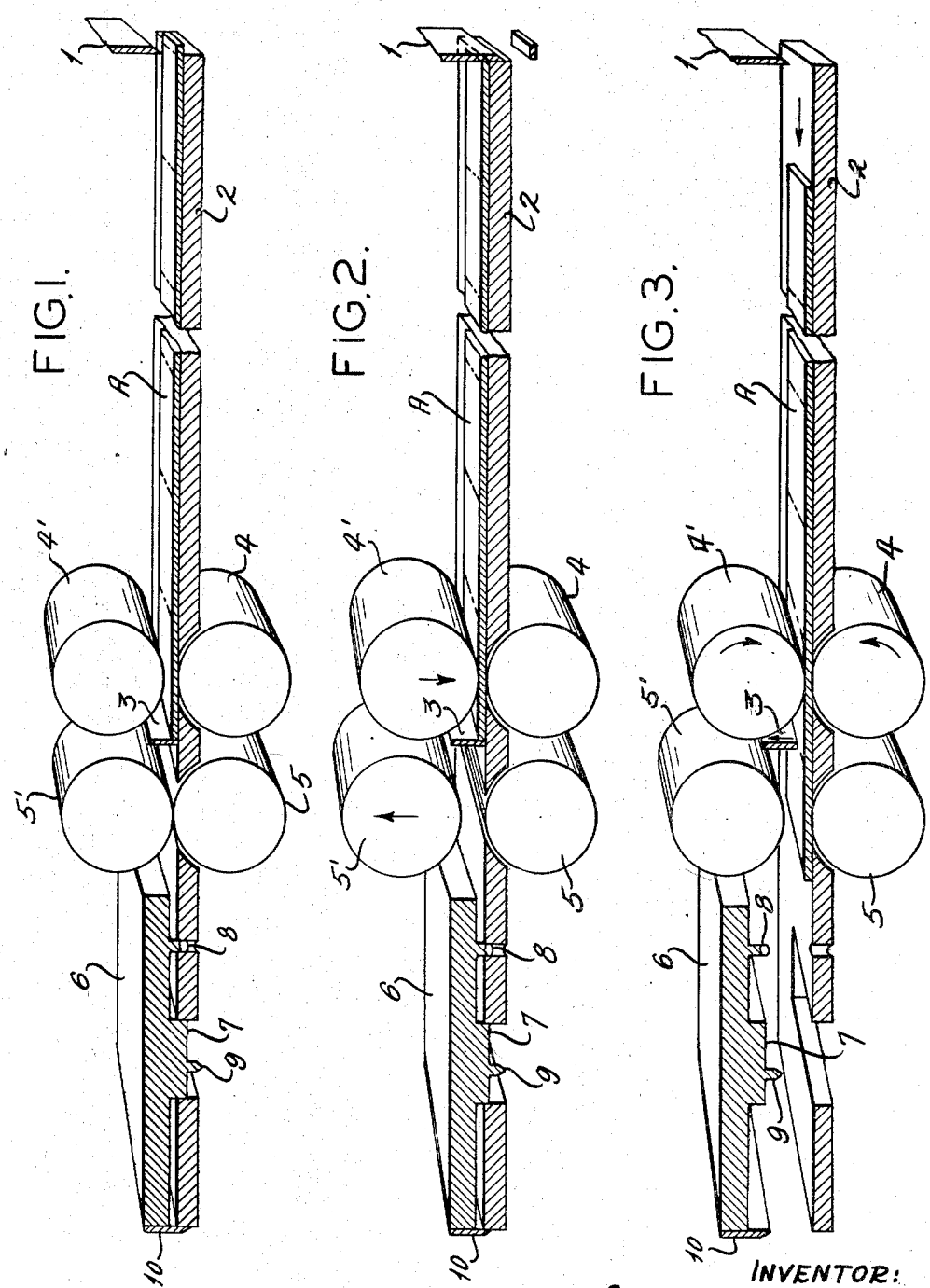

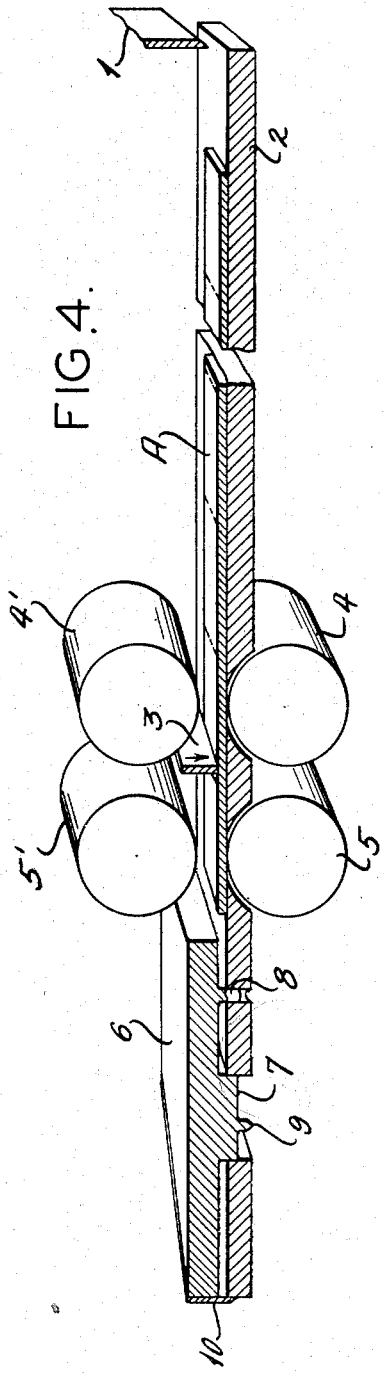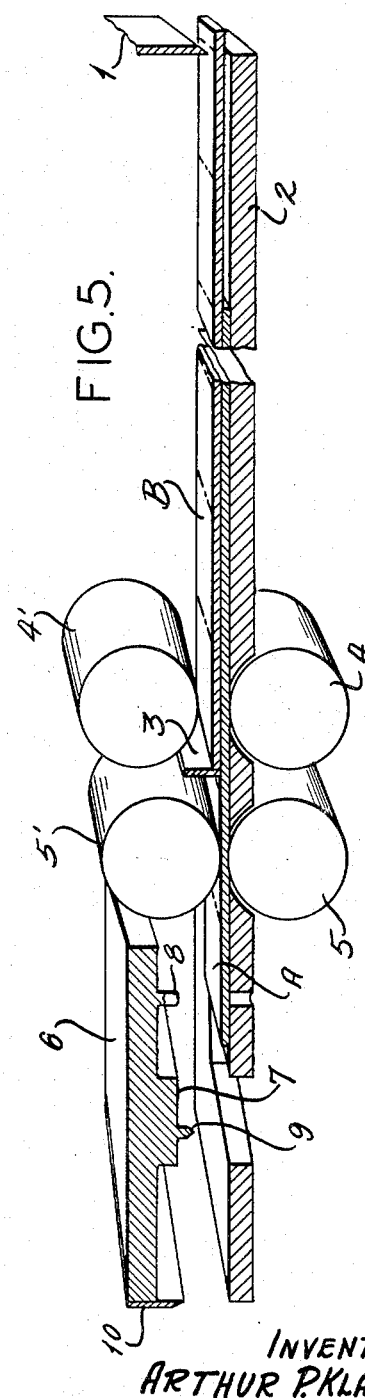

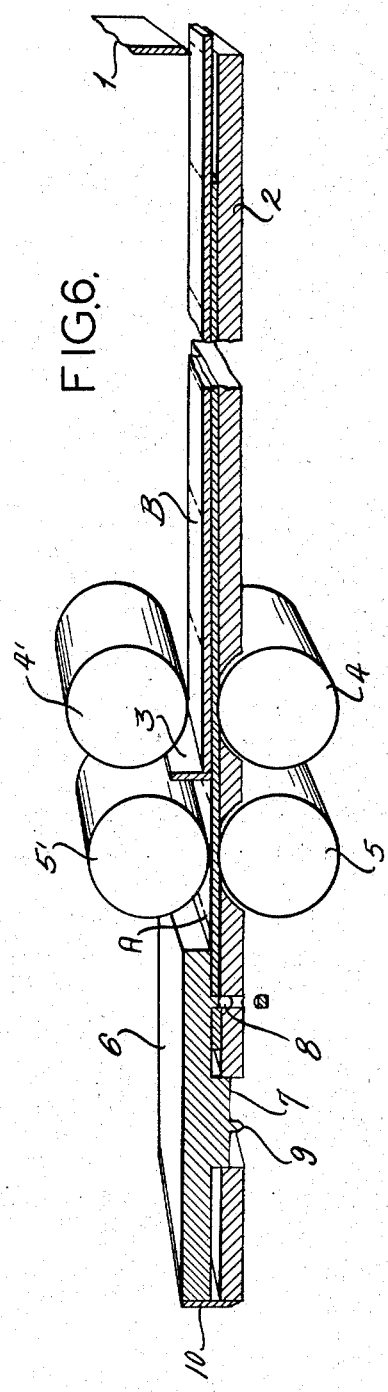
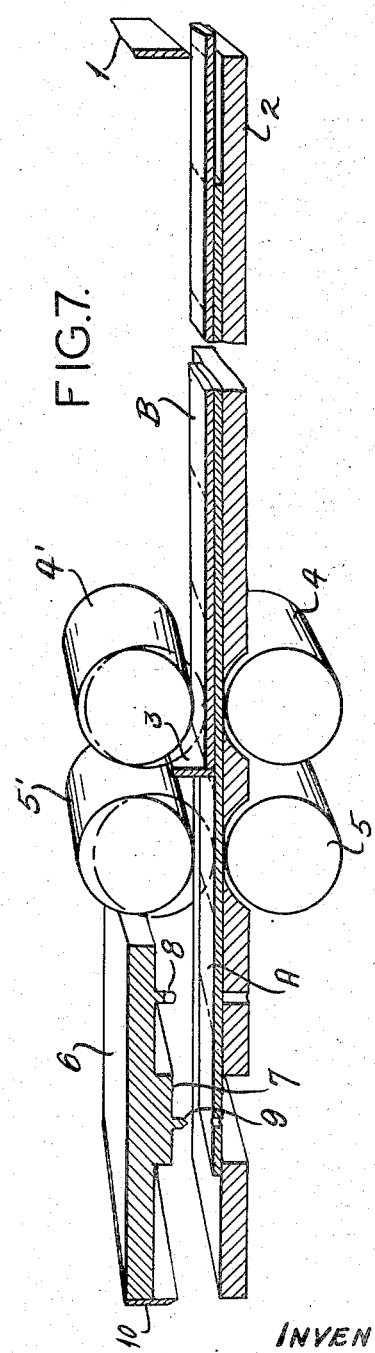

United States Patent Office 2,701,013
Patented Feb. 1, 1955

2,701,013

AUTOMATIC SHEET FEEDING, POSITIONING, PUNCHING, AND CUTTING MACHINE

Arthur P. Klasing, Webster Groves, Mo., assignor to Gaylord Container Corporation, St. Louis, Mo., a corporation of Maryland Application March 19, 1951, Serial No. 216,432

3 Claims. (Cl. 164—12)

My invention appertains to a punch press or die cutting machine and more particularly to a novel sheet feeding and sheet positioning device therefor.

The accurate positioning of the work below the ram of punch presses and die cutters has always presented a problem, especially in the paperboard industry. In many die cut paperboard items, extreme accuracy is required. An example of this is in the manufacture of interlocking cellular partitions. If the die cuts or punching cuts are not positioned with a high degree of accuracy, rapid machine assembly will be difficult, if not impossible.

Many factors cause variances in die cut sheets, one of the most important being the moisture content of the paperboard. The dimensions of a given sheet of paperboard will vary with different moisture contents. The moisture content is controlled by the surrounding temperature, the humidity, the age of the paperboard and many other factors sometimes due to imperfections in manufacture. There are variations in the moisture content even in a single sheet of paperboard. Any variation, however, in dimension will cause the last unit of the sheet to be inaccurately positioned under the reciprocating punch or die cutter, and this in turn will cause the cut-out to be inaccurately placed.

There has also long been a need for an automatic sheet feeding device wherein the operator could load the machine without bringing his hands near the reciprocating punch or die cutter. A commercially desirable sheet feeding system for a reciprocating punching and die cutting operation should have a provision for automatically re-cycling itself every time a new sheet is inserted so that any error encountered will not be cumulative and reappear in subsequent sheets.

One of the principal objects of this invention is to provide a device which will feed and accurately position sheets in a reciprocating punch and die or similar machine.

Another object of this invention is to provide an automatic sheet feeding device which will re-cycle itself so as to eliminate cumulative errors.

A further object of this invention is to provide a sheet feeding device which is completely automatic in operation except for loading the machine.

A still further object of this invention is to provide a feeding device for a reciprocating punch and die operation, so regulated as to cause every downward stroke of the machine to be a working stroke, thereby producing at least one finished piece for each stroke of the punch or die.

A further object of this invention is to provide a continuous sheet feeding device for a punch or die cut operation.

Another object of this invention is to provide a machine especially adapted to produce quantities of small finished pieces from large sheets.

Other objects and advantages of this invention will be apparent to those skilled in the art upon a full and complete understanding of the construction and operation of this device.

This invention is embodied in an automatic positioning means for a punching or die cutting machine, the means comprising an automatic trimmer and an automatic feeding device, in combination with a ram having a pilot hole punch, a tapering pilot, a cutout punch, and a cutoff knife.

The invention also consists in the parts and in the arrangements and combinations of parts hereinafter described and claimed. In the accompanying drawings which form a part of this specification and wherein like numerals and symbols refer to like parts wherever they occur, Figs. 1 through 7 are diagrammatic longitudinal perspective cross-sectional views of a preferred embodiment of this invention in various stages of operation.

Fig. 8 is a diagrammatic illustration of a mechanism by which the sequential movements of the apparatus may be effected.

Figs. 9, 10 and 11 are plan views of the cams for actuating the outer roll, the inner roll and the paper stop respectively.

Fig. 12 is a detail perspective on an enlarged scale of the three cams and associated parts.

Referring now to Figure 1, a trimming knife 1 is provided at the sheet receiving end of the base of the machine. The trimming knife 1 is very important in the overall plan of the machine, since in a preferred use of this device sheet paperboard is fed into the machine. Paperboard is subject to expansion and contraction due principally to variations in moisture content. If the paperboard sheet is cut to the exact size any considerable time before entering the punching or die cutting operation, the sheet would very likely be of improper dimension. In the instant machine, however, the cutting of the sheet is done by the trimmer 1 immediately before being processed into the punching or die cutting machine. There is virtually no time interval for a size change to occur. Following the cutting knife 1 is a long flat feeding table 2 upon which the operator of the machine places a single unpunched sheet to be processed. This unpunched sheet contains no pilot holes. A stop 3 is provided to properly position inner end of the sheet for a trimming operation. This stop moves intermittently up and down to allow the sheets to pass underneath at the proper time.

Feed rollers 4, 4' and 5, 5' are provided to advance the sheet to the next portion of the machine. In the embodiment of the machine described, the power feed rolls 4 and 4' advance the sheet a distance equal to the length of a finished piece plus one-half inch, while the rolls 5 and 5' advance the sheet a distance equal to the length of the finished piece alone. The extra half inch provided by the feed rollers 4 and 4' is necessary to compensate for the clearance required by the stop 3. The rolls 4 and 4' operate independently of the rolls 5 and 5'. The powered lower feed rolls 4 and 5 are rotatably maintained on fixed axes while the reciprocating idler rolls 4' and 5' are maintained on movable axes so that they may be intermittently raised and lowered to feed the work sheets at proper intervals for the punching or die cutting operation of the machine. The last portion of this machine is a combination reciprocating ram 6. The combination ram includes a standard punching die 7 to make cutouts of any desired shape in the sheet. Also provided is a pilot hole punch 8 which precedes the punch die 7. On the lower face of the punching die 7 is a tapering pilot 9 which positions the work accurately under the punching die 7. The tapering pilot 9 is of sloping outline with the widest portion at the base being substantially the same size as the pilot hole punch 8. Finally, the combination ram 6 is provided with a cutoff knife 10 which severs the completed punched article from the main sheet. All elements of the device, the punching die 7 and the tapering pilot 9 and the pilot hole punch 8 are attached to the rigid constantly reciprocating ram 6.

The embodiment of the machine described is used to cut cellular paperboard partitions and operates in the following manner:

As shown in Fig. 1, a sheet A of material to be punched or die-cut is placed on the sheet receiving table 2, the inner end of the sheet A being placed against the lowered stop 3 and the outer end extending over the outer end of the sheet receiving table 2. So positioned, the trimming knife 1 cuts off the overhanging portion thus accurately cutting the sheet A to a length which is an exact multiple of the length of a finished piece, as shown in Fig. 2. The rotating upper roller 4' is then lowered until it is in contact with the upper face of the sheet A. The stop 3 is raised and the rotating rollers 4 and 4' move the sheet A forwardly a unit feeding distance equal to the length of a finished piece plus one-half inch, as shown in Fig. 3, the one-half inch in this embodiment being the clearance for the thickness of the stop 3. At this point, as shown in Fig. 4, the outer roll 4' is raised and the stop 3 lowers to the top of the sheet A to prevent any sheet B subsequently laid on the sheet receiving table from sliding underneath. The stop 3 does not lower against the sheet A with sufficient pressure to restrain any motion of that sheet.

The inner roller 5' is then lowered, as shown in Fig. 5, to the top of the sheet A, moving it forwardly a unit feeding distance. The roller 5' is then raised and the combination ram 6 with the pilot hole punch 8 is lowered thereby punching a pilot hole in the sheet as shown in Fig. 6. At this stage, the forward end of the sheet has not been advanced far enough to be under the main punch 7 so no cut is made by said main punch 7 in the operation just described. The combination ram 6 is then raised and the inner roller 5' again is lowered and moves the sheet A forwardly another unit feeding distance. The forward motion of the sheet stops A when the inner roll 5' is raised and no longer contacts the surface of the sheet A. In this position shown in Fig. 7, the sheet A is not horizontally restrained by any means, and it is merely resting on the flat base of the machine. The combination ram 6 is then lowered with the tapering pilot 9 passing through the previously punched pilot hole. The sides of the pilot 9 are sloped so as to move the sheet A into proper alignment with the main punch or die 7 connected to the base of the taper. The punching die 7 follows the tapering pilot 9 and makes the cutout in the accurately positioned sheet.

In this machine, the punch or die cutter 7 is superimposed over the pilot hole so the pilot hole is in the waste material after it has served its purpose. Thus, the portion surrounding the punched or die cut hole is retained with no evidence of a pilot hole therein. The combination ram 6 is then raised and the inner roller 5' again is lowered and moves the sheet A forwardly a unit feeding distance. Thereafter, the inner roller 5' again disengages the sheet A and the combination ram 6 is lowered. After the sheet is again positioned by the tapering pilot 9 for the next cutout, the punching or die cutting operation again takes place and the leading edge of the sheet is positioned beneath the cutoff knife 10. Once again the combination ram 6 is raised and the roller 5' is lowered to engage the sheet, forwarding it another unit distance. As the roller 5' is raised to disengage the sheet, the combination ram is lowered thereby simultaneously punching a pilot hole, a cutout hole, and severing the first finished piece with the cutoff knife 10.

This process is continuous and produces a finished piece with each stroke of the ram 6. At any time after the first sheet A has begun to go beneath the stop 3 and the roller 4' has been raised, another single sheet B may be loaded and trimmed on the sheet receiving table 2. The machine may be made to re-cycle itself after a convenient number of strokes of the combination ram 6.

This automatically-fed machine re-cycles itself for each new sheet since the longitudinal position of the prior sheet in no way affects the position of the new sheet. Thus, if any error whatsoever occurs in the first sheet that error will not carry over to the second or subsequent sheets. The only edgewise contact between sheets in this embodiment is after the first sheet has progressed past the inner rollers 5 and 5' toward the delivery end of the machine. When this has happened, the next sheet being in abutting relation with the first sheet forwards that sheet the proper unit feeding distance. In the embodiment presented there is no tolerance or margin between finished pieces, the only waste being the actual cutout.

It is to be understood that the embodiment herein described is illustrative and not restrictive, and it is also to be understood that the invention may be susceptible of embodiment in other modified forms, and that all such modifications which are similar or equivalent hereto come equally within the scope of the claims.

In the embodiment presented, all of the components are synchronized so they will operate in the sequence suggested in the description of the operation, but the components while operating in timed relation, do not necessarily operate simultaneously. All of the components operate automatically and only one operator is required to load the machine.

While various types of apparatus might be employed for operating the several parts of the hereinbefore described feeding, cutting and punching apparatus, there is illustrated in Figs. 8 to 12 one specific form of mechanism for accomplishing the desired action of the machine.

In Fig. 8 each of the bottom rolls 4 and 5 is illustrated as having connected with one end thereof a gear by which the roll may be rotated in the desired direction from an intermediate or idler gear. The outer roll gear is designated 15 while the inner roll gear is designated 16. Between and in geared connection with the gears 15 and 16 is the large idler gear 17.

The outer top roll 4' has mounted upon the shaft 18 thereof a lifting block 19 having an angled under face 20 as shown.

The inner top roll 5' has on the shaft or trunnion 21 thereof a similar lifting block 22 having an angled under face 23.

The paper stop blade 3 which is located between the upper rolls 4' and 5' is provided on the end adjacent to the blocks 19 and 22 with the cam follower finger 24.

Associated with lifting blocks 19 and 22 are pivot arms 25 and 26 respectively which when oscillated in the manner hereinafter described effect the raising of the adjacent blocks and the rolls connected therewith.

The numeral 27 designates a cam shaft which has one end aligned with the paper stop and is located between the pivot arms 25 and 26 and on this shaft are mounted the outer roll cam 30, the inner roll cam 31 and the gate or stop cam 32, which cams are shown in detail in Figs. 9 to 11 respectively. As will be apparent, particularly upon reference to Fig. 12, the outer roll cam 30 is positioned to effect actuation of the pivot arm 25, the inner roll cam is positioned to effect actuation of the pivot arm 26, and the gate cam is positioned to engage the follower finger 24 to effect the desired raising and lowering of the gate or paper stop 3.

The gear 16 connected with the inner bottom roll is mounted upon a shaft 33. This shaft 33 at its outer end passes through a hollow outer shaft 34 into a one-way clutch unit 35. No detailed illustration of this one-way clutch is given since the same is of standard commercial make and its operation is well known. The hollow shaft 34, connected to the clutch, has connected with it a rocker arm 36 to which is attached an end of a rod 37 having its other end pivotally eccentrically connected as at 38 to a fly wheel 39 rotated by a suitable motor 40. Also connected to the eccentric pivot 38 is the ram 6.

Encircling the shaft 33 is an inner hollow shaft 41 which carries a ratchet wheel 42 adapted to be operatively engaged by the pawl 43 which is connected with the rocker arm 36 as illustrated. The inner end of the inner hollow shaft 41 carries a gear 44 which meshes with the gear 45 which is carried by the cam shaft 27 as shown.

For the operation of the cut-off knife 1, there is provided the motor 46 which is operatively connected with a one-turn clutch 47. This one-turn clutch is also of standard well known construction and no detailed illustration of the same is given. In the operation of the cut-off knife, which is connected with the one-turn clutch by the connecting rod 48, the clutch is controlled by a micro switch 49 which, as illustrated, is positioned adjacent to the bottom outer feed roll 4.

As illustrated in Figs. 9 to 11, the cams are marked off to indicate seven operating stations. As shown in the drawings, the outer roll is in its upward position in Figs. 1, 4, 5, 6 and 7. Accordingly the outer roll cam is provided with a projection at stations 1, 4, 5, 6 and 7. The remainder of the stations (2 and 3) on the outer roll cam are not provided with elevating projections and it will be apparent that in Figs. 2 and 3 of the drawings, the outer roll is in the downward position.

As is also evident from the figures of the drawings, the inner roll is in elevated position in Figs. 2, 3, 4 and 7 and, accordingly, the inner roll cam is provided with a projection at stations 2, 3, 4 and 7. The remaining stations (1, 5 and 6) have no elevation since, as shown in Figs. 1, 5 and 6, the inner roll is in the downward position.

The paper stop is shown elevated in Fig. 3 and accordingly the stop cam 32 is provided with a projection only at station 3.

In the operation of the mechanism above described, when the rocker 36 is moved in a clockwise direction, the pawl 43 forces the ratchet wheel in a clockwise direction a predetermined distance determined by the teeth in the wheel. Since the ratchet wheel 42 is connected through the inner tubular shaft 41 with the gear 44, rotation of this wheel will impart rotary movement to the cam gear 45 with which the gear 44 is connected.

As the cam shaft 27 is rotated in this manner, the cams 30 and 31 carried thereon will force the ends of the pivot arms outwardly against the angled underfaces 20 and 23 so as to effect the lifting of the blocks 19 and 22 in the proper sequence. The sliding action of the pivot arms against the angled faces of the lifting blocks forces the lifting blocks upwardly and while no guide means for the lifting blocks have been illustrated, it is to be understood that such blocks may be maintained between or within vertical tracks so that the desired lifting action may be effected.

As will be readily apparent, with the rotation of the shaft 27, the gate or paper stop cam will also be rotated in proper timed relation with the other cams to elevate the paper stop to permit the fiberboard to pass therebeneath. Here also, suitable means will be provided to guide the paper stop in its vertical or up and down movements. When the rocker arm 36 is oscillated in a counter-clockwise direction, the pawl 43 slides freely over the teeth of the ratchet wheel and no movement is imparted to the same or to the gears 44 and 45 with which it is operatively connected. However, such counter-clockwise movement is transmitted through the hollow shaft 34 which is connected with the rocker to the one-way clutch 35 which transmits this counter-clockwise motion to the shaft 33 which supports the gear 16 connected with the inner bottom feed roll. This feed roll 5 will be rotated in a counter-clockwise direction and through the idler 17 connected therewith will effect corresponding counter-clockwise rotation of the bottom outer roll 4. The rod 37 is provided with suitable adjusting means as at 37′ by which the stroke can be adjusted so as to permit easy variation of the starting and stopping points of the rotating bottom feed roll.

The gear 15 which drives the outer bottom roll is of slightly smaller diameter than the gear 16 since it is necessary for the outer roll 4 to rotate a slightly greater distance. The reason for this is that the bottom roll forwards the fiberboard sheet a unit distance plus the width of the paper stop as hereinbefore set forth.

As hereinbefore stated, when the paper stop is lowered after the fiberboard sheet has been extended therebeneath as illustrated in Figs. 4 to 7, it only rests lightly upon the underlying sheet so that the movement of this sheet will not be interfered with by the stop. This action is effected by reason of the fact that the high point on the stop cam at station 3 is only sufficient to elevate the stop a distance merely slightly greater than the thickness of the first sheet of paper material.

What I claim is:

1. Apparatus for moving strip sheet material to a cutting machine, said apparatus comprising a first pair of feed rollers in superposed aligned relation, the lower roller being arranged for contact with the lower surface of the sheet to be fed, the upper roller being adapted to have intermittent vertical movement relative to the lower roller for engagement with the upper surface of the sheet to co-act with the lower roller to feed the sheet, a second pair of feed rollers positioned in superposed relation and in horizontally spaced parallel relation with the first pair to receive between them the sheet fed from the first pair, the lower roller of the second pair being arranged for contact with the lower surface of the sheet being fed from the first rollers, the upper roller of the second pair being adapted to have intermittent vertical movement relative to the underlying roller for engagement with the upper surface of the sheet to continue the feeding movement of the sheet at a period when the upper roller of the first pair has been moved out of contact with the sheet, means for driving at least one of each pair of said feed rollers, a stop member positioned between the upper rollers of the two pairs and adapted to have intermittent vertical movement into and out of the path of travel of a sheet to limit the initial extent of placement movement of a sheet between the separated first pair of rollers, a punch and die cutter means on the side of the second pair of rollers remote from the first pair for operation upon the sheet after its passage between the second pair of rollers, and means for effecting synchronization of the said intermittent movements of said upper rollers of said pairs and said stop member, whereby to first locate the stop member in a position to limit the said extent of placement movement of the sheet between the first pair of rollers when the upper one thereof is out of sheet engaging position, then move the stop member out of the path of the sheet while moving the upper roller of the first pair into engagement with the sheet to advance the sheet a predetermined distance toward and between the rollers of the second pair, then move the upper roller of the first pair out of engagement with the sheet after the latter has been advanced the said predetermined distance and reversely move the stop member back to a position relative to the top of the sheet to limit the extent of placement movement of a second sheet between the first pair of rollers, then move the upper roller of the second pair into contact with the sheet to continue advancement of the sheet to a predetermined position to be operated upon by said punch and die cutter means, then move the upper roller of the second pair out of contact with the sheet, and then move the punch and die cutter means for operation on the sheet.

2. The invention according to claim 1, with a cut-off knife in spaced relation with said stop member and upon the side of the first pair of rollers remote from the stop member and adapted to cut a sheet to proper length before the sheet is engaged by and between the first rollers.

3. The invention according to claim 1, in which the synchronizing means further functions to intermittently move the upper roller of the second pair into and out of contact with the wheel whereby the sheet will be advanced to the cutting machine in predetermined amounts.

References Cited in the file of this patent

UNITED STATES PATENTS

| Number | Name | Date |
|---|---|---|
| 395,211 | Breul | Dec. 25, 1888 |
| 759,070 | Bradley | May 3, 1904 |
| 863,204 | McKee | Aug. 13, 1907 |
| 928,509 | Dunham | July 20, 1909 |
| 1,423,917 | Diamont | July 25, 1922 |
| 1,504,182 | Carter | Aug. 5, 1924 |
| 1,729,123 | Philip | Sept. 24, 1929 |
| 1,746,032 | Ely | Feb. 4, 1930 |
| 1,755,994 | Kurkowski | Apr. 22, 1930 |
| 1,790,301 | Gilburg | Jan. 27, 1931 |
| 1,796,417 | Wittek | Mar. 17, 1931 |
| 2,295,953 | King | Sept. 15, 1942 |

FOREIGN PATENTS

| Number | Country | Date |
|---|---|---|
| 155,158 | Germany | Oct. 24, 1904 |
| 547,190 | Germany | Mar. 19, 1932 |